United States Patent
Rao (10) Patent No.: US 8,159,501 B2
(45) Date of Patent: Apr. 17, 2012

(54) SYSTEM AND METHOD FOR SMOOTH POINTING OF OBJECTS DURING A PRESENTATION

(75) Inventor: Ravishankar Rao, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 293 days.

(21) Appl. No.: 12/172,222

(22) Filed: Jul. 12, 2008

(65) Prior Publication Data
US 2008/0259090 A1 Oct. 23, 2008

Related U.S. Application Data

(63) Continuation of application No. 11/367,518, filed on Mar. 3, 2006, now abandoned.

(51) Int. Cl.
*G09G 5/02* (2006.01)
(52) U.S. Cl. ........................... 345/593; 345/156
(58) Field of Classification Search .................. 345/593, 345/156
See application file for complete search history.

(56) References Cited

U.S. PATENT DOCUMENTS

| | | | |
|---|---|---|---|
| 4,687,918 A | 8/1987 | Hughes et al. | |
| 4,846,694 A | 7/1989 | Erhardt | |
| 4,916,007 A * | 4/1990 | Manning et al. | 428/203 |
| 5,231,697 A | 7/1993 | Yamada | |
| 5,287,417 A * | 2/1994 | Eller et al. | 382/276 |
| 5,428,417 A | 6/1995 | Lichtenstein | |
| 5,519,818 A | 5/1996 | Peterson | |
| 5,568,279 A | 10/1996 | Hinman et al. | |
| 5,583,946 A | 12/1996 | Gourdol | |
| 5,734,761 A | 3/1998 | Bagley | |
| 5,844,556 A * | 12/1998 | Takitani et al. | 715/764 |
| 5,861,886 A | 1/1999 | Moran et al. | |
| 5,880,745 A | 3/1999 | Miichi | |
| 5,940,065 A | 8/1999 | Babb et al. | |
| 6,050,690 A | 4/2000 | Shaffer et al. | |
| 6,091,408 A | 7/2000 | Treibitz et al. | |
| 6,100,904 A * | 8/2000 | Gupta | 345/442 |
| 6,108,001 A | 8/2000 | Tuttle | |
| 6,229,550 B1 | 5/2001 | Gloudemans et al. | |
| 6,253,164 B1 | 6/2001 | Rohm et al. | |
| 6,333,753 B1 | 12/2001 | Hinckley | |

(Continued)

OTHER PUBLICATIONS

Hunt,R.W.G.,"The Reproduction of Colour",pp. 157-165,Fountain Press,South Kensington, England, 1967.

(Continued)

*Primary Examiner* — Daniel Washburn
(74) *Attorney, Agent, or Firm* — August Law, LLC; George Willinghan (57) ABSTRACT

A system and method are provided that allows a speaker to provide real-time annotations to one or more displayed images during a presentation. The speaker inputs the annotations my manually identify a portion of the displayed image using an input mechanism such as a touch screen that is in communication with a presentation monitor and a control system that is controlling the presentation. The identified portions are annotated onto the displayed images using a adaptive color that is selected to provide optimum contrast with the existing colors in the displayed image. In addition to providing adaptive, contrasting colors for the annotations, imperfection such as waviness are removed from the identified portions to created corrected portions that are then annotated onto the presentation image. Annotation is accomplished through computer generated graphics or through the use of a motorized, controllable laser pointer.

20 Claims, 6 Drawing Sheets

U.S. PATENT DOCUMENTS

| | | | |
|---|---|---|---|
| 6,538,643 B2 | 3/2003 | Mori et al. | |
| 6,642,918 B2 | 11/2003 | Uchida et al. | |
| 6,741,266 B1 | 5/2004 | Kamiwada et al. | |
| 6,744,918 B1 * | 6/2004 | Caldato et al. | 382/164 |
| 6,747,636 B2 | 6/2004 | Martin | |
| 6,761,456 B2 | 7/2004 | Hamana et al. | |
| 6,802,041 B1 * | 10/2004 | Rehm | 715/201 |
| 6,944,584 B1 * | 9/2005 | Tenney et al. | 703/22 |
| 6,989,112 B2 * | 1/2006 | Teng et al. | 252/582 |
| 7,071,950 B2 * | 7/2006 | Fujioka et al. | 345/589 |
| 7,337,389 B1 * | 2/2008 | Woolf et al. | 715/230 |
| 7,380,722 B2 * | 6/2008 | Harley et al. | 235/462.45 |
| 2003/0071850 A1 | 4/2003 | Geidl | |
| 2003/0142038 A1 * | 7/2003 | Folk, II | 345/2.1 |
| 2004/0151218 A1 * | 8/2004 | Branzoi et al. | 372/25 |
| 2004/0233197 A1 * | 11/2004 | Liu et al. | 345/442 |
| 2006/0224575 A1 * | 10/2006 | Ostojic | 707/4 |
| 2006/0224962 A1 * | 10/2006 | Ostojic et al. | 715/716 |
| 2006/0225037 A1 * | 10/2006 | Glein et al. | 717/117 |

OTHER PUBLICATIONS

M. Plass and M. Stone, "Curve-Fitting with Piecewise Parametric Cubics",SIGGRAPH 1983:10th Annual Conference on computer Graphics and interactive techniques, pp. 229-239.

J.D. Foley, A. Van Dam, S.K. Feiner and J.F. Hughes,Computer Graphics and Principles, Second Addition, 1997, p. 590, Addison Wesley Publishing Company.

\* cited by examiner

SYSTEM AND METHOD FOR SMOOTH POINTING OF OBJECTS DURING A PRESENTATION

CROSS-REFERENCE TO RELATED APPLICATIONS

The present application is a continuation of co-pending U.S. application Ser. No. 11/367,518, filed Mar. 3, 2006. The entire disclosure of that application is incorporated herein by reference.

FIELD OF THE INVENTION

The present invention is directed to the field of interface devices for computer users, and more particularly to the use of pointing devices during presentations.

BACKGROUND OF THE INVENTION

In conference and meeting presentations, images are displayed on a monitor or projected on a screen for audience viewing. A speaker calls attention to specific portions of the displayed images using pointing devices such as illuminated arrows and laser pointers. Although laser pointers are generally preferred pointing devices, there are various limitations associated with the use of laser pointing devices. For example, the size of the projected image is typically large, especially in auditorium settings, and the speaker is positioned relatively close to the projected image. At this relatively close proximity to the projected image, the speaker cannot easily view the entire image, and there is significant perspective distortion when viewing projected images up close. Therefore, the speaker cannot easily view the presentation and must use a small computer screen on which the images are simultaneously displayed, alternating attention between the computer screen and the projected image.

Since laser pointers are typically held in the hand of the speaker and manually moved to the desired locations on the projected images, laser pointers are susceptible to motion jitter, causing inaccurate pointing and viewing problems for the audience. Moreover, the speaker has to face the projected image to ensure that the correct areas of the screen are selected using the laser pointer, preventing eye contact between the speaker and the audience. In addition, the use of these physical highlighting systems are only applicable to presentations given at a single location and not to presentations made simultaneously to multiple distributed locations, for example across a computer network or through a video conference.

Systems have been developed in an attempt to overcome the limitations of using physical and optical pointers in group presentations. For example, U.S. Pat. No. 6,747,636 is directed to a display system for overlaying graphics applied to a display surface onto the graphics output of an application running in the foreground, and to allow user input to the application program by means of a touch sensitive screen. In this way, a completely interactive display system is provided in which the user can highlight and edit information generated by the computer program by simply drawing on the touch sensitive screen. In operation, when a user selectively applies pressure in the form of a point, line or script to the surface of a touch screen, information is conveyed by the touch screen to a computer, which in response updates the image projected by the computer screen with the user script and reproduces such information at a sufficient rate that user drawings on the board become interactive. Alternatively, the computer can interpret the user's touch input, and in response emulate operation of the mouse, a light pen or a digital command, for conveying information to the application program being executed. User script is overlaid onto the image, causing the image to be updated to include the user drawing, for example, points, lines, or script. The system however, does not attempt to interpret the drawings made by the user or to correct errors or waviness in the points, lines or script entered by the user on the touch screen. In addition, the system does not provide for enhancing contrast between the drawings entered by the user and the information displayed by the computer on the LCD screen in order to enhance the ability of the viewing audience to identify the highlighted areas of a projected image.

U.S. Pat. No. 6,538,643 is directed to a method and system for presenting slides in which touch pad portions of a touch pad are mapped to pre-selected parts of a presented slide such that a pre-selected part of the present slide is highlighted in response to the corresponding touchpad portion being touched. Instead of highlighting portions of the slide, color change, outlining or other ways of distinguishing the selected portions of the slide can be used. An operator generates slides to be displayed on a display screen and associates highlighting techniques, such as color change, blinking or brightening, animated builds, check marks or underlining with a pre-selected part, point, portion or attribute of the slides for drawling audience attention to the pre-selected parts of the slides. The operator may then touch a touch pad portion of touch pad to execute the highlighting of a corresponding pre-selected part of the slide. This system, however, requires pre-selection of areas of a presentation slide, association of a pre-determined highlighting technique with each pre-selected area and mapping each pre-selected area to a specific portion of the touchpad device. The system does not provide for random, real-time user input of highlighting during a presentation or for the selection of random areas of the presentation slide outside of the pre-selected areas. In addition, the system does not maximize the highlighting contrast between the pre-selected areas of the presentation slide and the non-selected areas of the presentation slide.

U.S. Pat. No. 5,428,417 is directed to a visual lecture aid that provides a lecturer with a remote-controlled touch panel assembly, which makes available any one of a group of stored graphic icon pointers and highlighters that can be seen by the lecturer on a display panel. These icon pointers and highlighters include highlighting overstrikes and highlighting squares. The lecturer utilizes the remote-controlled touch panel to select each of the pointing and highlighting icons by touch selection from a menu of displayed icons on the display panel and sequentially positions each icon and overstrike highlighting line by a simple finger movement over the display panel and subsequently freezes the final position of each pointing icon by touching a displayed freeze button. In addition to the graphics, both projected color selection and brightness control are available to the lecturer from a remote controlled display panel. This system, however, only provides for the selection of specific predefined graphics and does not allow for entry or recognition of user-defined graphics or shapes on the touch screen. In addition, the color selections and brightness are predefined within the system, and the user must select from one of these predefined colors. The colors, however, are not created or selected to maximize the contrast of the display screen over which the selected graphics are displayed.

Therefore, a need exists for a pointing system that enables a speaker to maintain eye-contact with the audience, and to point at objects on the displayed screen without introducing motion jitter. Suitable systems will provide for random and real-time user selection of highlighted regions of a selected image during the course of the presentation while permitting the speaker to generally maintain focus and eye-contact with the audience. Color contrast of the highlighted area will be selected to maximize contrast with the portions of image to be highlighted. In addition, the system can work with computer generated highlights and with conventional laser pointers.

SUMMARY OF THE INVENTION

Exemplary embodiments in accordance with the present invention are directed to systems and methods that allow a speaker or presenter, while facing the audience and during a presentation, to select areas of a projected image for highlighting and to highlight the selected images on the projected image. Highlighting is accomplished by using lines, areas or figures that are superimposed onto the projected image or by controlling the movement of a pointing device such as a laser pointer. In addition to facilitating an indication by the speaker or presenter of an area or areas to be highlighted in the projected image, the exemplary systems and methods of the present invention reduce or eliminate random jitter or jagged lines in the displayed highlight or controlled pointing device using, for example, motion smoothing applied to indications made by the presenter. For example when the projected highlight is a traced path, the trajectory of the path is rendered with a smooth curve before projection onto the displayed image.

In one exemplary embodiment, a system in accordance with the present invention includes a touch-sensitive display monitor, i.e. touch screen, that displays the projected image to the speaker and that accepts entry of user-selected indication of the areas of the projected image to be highlighted. For example, the speaker can contact regions of the touch screen corresponding to the areas of the projected image that are to be highlighted, can draw boxes, circles or other geometric shapes around the area of the image to be highlighted or can trace paths between any two objects within the projected image. The regions of the touch screen monitor that are contacted by the speaker are formulated as lines, areas or cursors that are projected on the displayed image. The color, brightness and opacity of the projected lines, areas or cursors are adapted to contrast with the existing color of the displayed image in the region of the line, area or cursor while still providing for an unobstructed view of the information contained in the projected image. In one embodiment, the area of the displayed image that is touched by the speaker is rendered through a color that is contrasting to the average background color around the area of the image that is touched or selected by the speaker.

DETAILED DESCRIPTION

Figure 1:
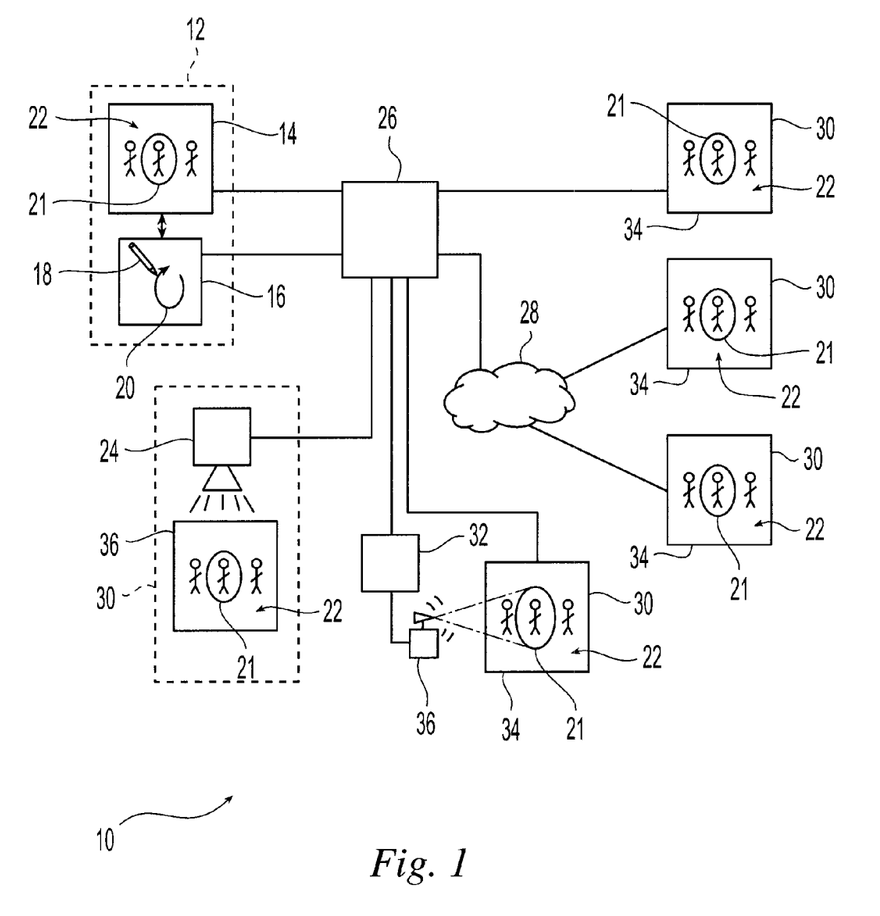
FIG. 1 is a schematic representation of an embodiment of a presentation system for use with methods for smooth pointing of objects during a presentation in accordance with the present invention.

Referring initially to FIG. 1, an exemplary embodiment of a presentation system 10 for use with exemplary methods in accordance with the present invention is illustrated. Systems and methods in accordance with the present invention can be used in any arrangement where one or more speakers are presenting information or data to multiple recipients located in one or more physical locations. Suitable arrangements include, but are not limited to, video conferences, lectures, distance learning programs, Internet based programs, conference lectures and classroom lectures. As illustrated, the presentation system 10 includes at least one control system 26 for controlling or conducting the presentation. The control system 26 is capable of generating and storing data or information to be displayed during the course of the presentation. Typically, these data or information are in the form of graphs, charts, images or slides that are stored in electronic, machine-readable format and are often computer-generated using one or more software programs known and available in the art. Suitable control systems include, but are not limited to, computer systems such as laptop computers, desktop computers and servers, programmable logic controllers, EEPROM's, single function control systems specifically created to conduct presentations and combinations thereof.

The system 10, also includes a plurality of presentation display platforms 30 in communication with the control system 26. The control system 26 controls the display of the presentation data on these display platforms. The display platforms 30 are in direct communication with the control system 26 and controlled thereby without any intermediate controllers or processors or are in contact with the control system across one or more networks 28 or through additional nodes (not shown). Suitable networks include any type of local area network or wide area network known and available in the art. Suitable display platforms are capable of displaying images 22 stored in electronic, machine-readable format and communicated to the display platform 30 by the presentation control system 26. Suitable display platforms include, but are not limited to, computer monitors 34, including cathode ray tubes (CRT's), plasma displays and liquid crystal displays (LCD's), and projection type displays that include a projection screen 36 and a projection mechanism 24, for example projectors or LCD's used in combination with overhead projectors. A suitable projection type display is the Epson EMP-732, commercially available from the Seiko Epson Corporation of 3-3-5 Owa, Suwa, Nagano, Japan.

To facilitate real-time interaction between the speaker giving the presentation and the displayed images, the system 10 includes an interaction mechanism 12 that allows the speaker to control the presentation, for example to control the selection of images to be displayed on the display platforms. In general, the interaction mechanism facilitates user-defined input into the displayed images during the presentation, for example highlighting selected portions of the displayed images in real-time during the presentation. These selected highlights are shown or projected on the displayed images for viewing by the audience. The presentation interaction mechanism 12 is in communication with the presentation control system 26 and includes a presentation monitor 14. In one embodiment, the presentation interaction mechanism 12 is included in the presentation control system 26. In one embodiment, the presentation monitor 14 is independent of and separate from the display platforms, although in one embodiment the presentation monitor and a display platform can be combined. The presentation monitor is capable of displaying the images 22 provided by the control system. Any monitor capable of displaying electronic or computer-generated images can be used. Suitable presentation monitors are known and available in the art and include the same types of devices that can be used as display platforms. In one embodiment, the presentation monitor 14 is positioned so that it is viewable by the presenter or speaker, and in particular is viewable by the speaker such that the speaker maintains eye contact with the audience during the presentation. In one embodiment, the presentation control system simultaneously displays the images on one or more presentation platforms and the presentation monitor.

The presentation interaction mechanism 12 also includes at least one pointing device or input mechanism 16 that allows the speaker or user to manually annotate a displayed image in real time by indicating or drawing generally straight lines, non-rectilinear lines, i.e. curves, two-dimensional objects, for example the perimeter of a geographic shape, alpha-numeric annotations and combinations thereof on the image displayed on the presentation monitor and the presentation platforms. A plurality of input mechanisms 16 can also be provided, for example where each input mechanism is arranged to facilitate a specific type of user-defined input. The input mechanism 16 is in communication with the control system 26. In one embodiment, the input mechanism 16 is in communication with but separate from the presentation monitor 14. In another embodiment, the input mechanism 16 and presentation monitor 14 are integrated into a single device, e.g. a touch sensitive display screen. In one embodiment, this single device is the control system. Suitable user interaction mechanisms include, but are not limited to, any mechanism known and available in the art that permits manual entry of user input into a computer-generated display field, for example a point-and-click device such as a computer mouse or trackball, a pressure pad, a touch screen and a pressure tablet used in combination with a stylus 18. In one embodiment, the input mechanism 16 is a touch screen, for example that is part of a general purpose computer system. Suitable touch screens are commercially available as add-on touch-screens, called touchscreens.com, from Mass Multimedia Inc. of Colorado Springs, Colo.

The input mechanism 16 facilitates manual selection of a user-identified portion 20 of the displayed image. This user-identified portion 20 is then displayed as a highlighted portion 21 of the displayed image on all the display platforms. In one embodiment, the highlighted portion 21 is displayed on the image by the control system using computer-generated graphics. In another embodiment, the control system is in communication with an optical pointer, e.g. a laser pointer 36, through a motorized or mechanical control mechanism 32. The control system 26 through the mechanical control mechanism 32 moves the laser pointer 36 to trace the user-defined highlighted area 21 on the displayed image 22. Suitable mechanical control mechanism, laser pointers and control software are known and available in the art.

Figure 2:
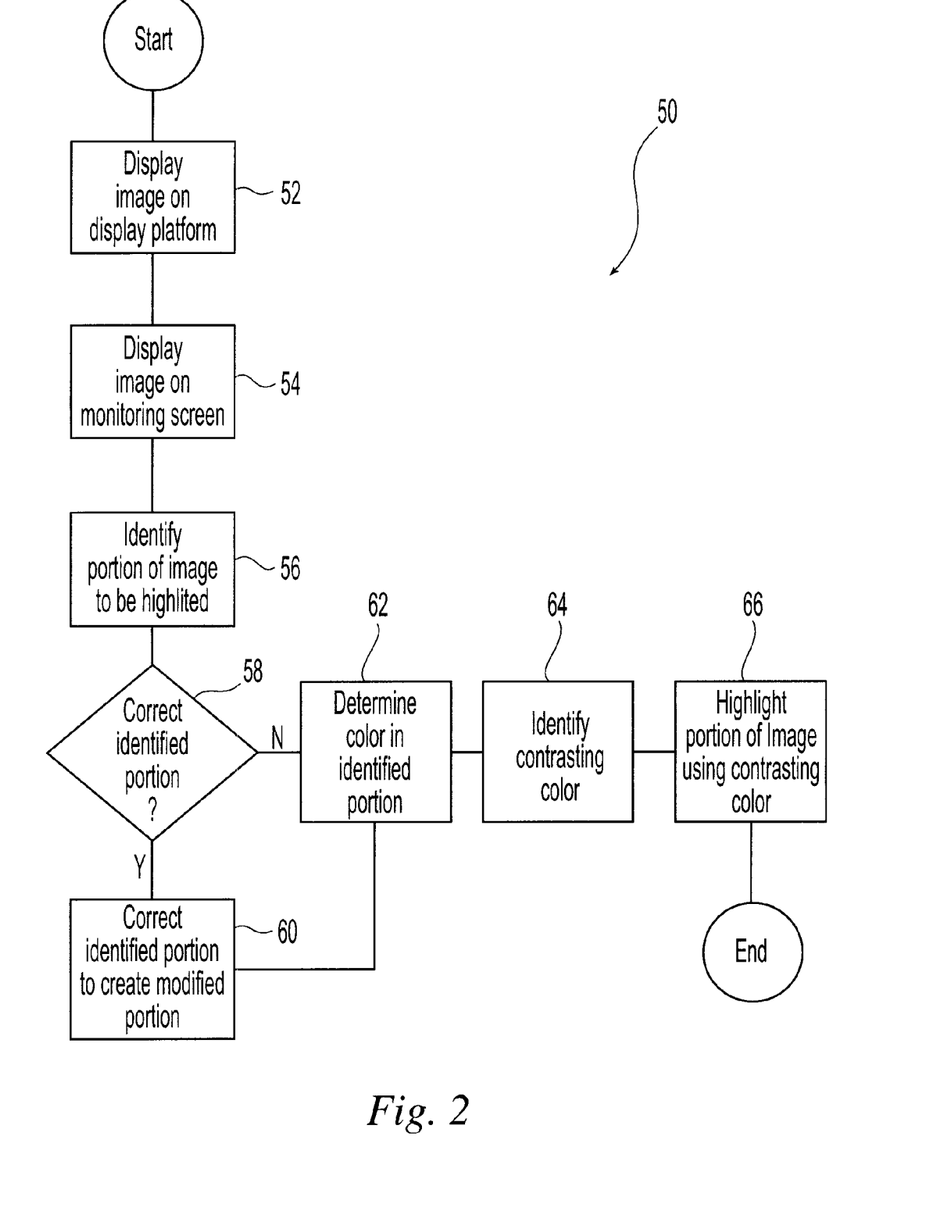
FIG. 2 is a schematic representation of an embodiment of a method for smooth pointing of objects during a presentation in accordance with the present invention.

Referring now to FIG. 2, an exemplary embodiment of a method for highlighting a portion of the displayed image 50 is illustrated. An image or slide from a presentation containing at least one, and preferably a plurality of images is displayed 52 on at least one display platform. In one embodiment, the image is displayed simultaneously on a plurality of display platforms. These display platforms can be located in a single physical or geographic location, for example an auditorium, conference room or lecture hall, or at a plurality of distributed geographic locations, for example a plurality of offices located at various locations across a country or throughout the world. Suitable methods for displaying the image include any method for displaying an electronically generated or stored image to be viewed by either multiple persons in one location or by multiple people located at multiple locations. In one embodiment, the images are displayed by a control system, e.g. a computer, on a CRT, LCD, plasma or projection display in communication with the control system and of sufficient size to be viewed by the presentation audience.

In another embodiment, the image is displayed simultaneously on a monitoring screen 54 that is separate from and independent of the display platform. The monitoring screen is in communication with the control system and is capable of receiving electronically generated images from the control system for display. Suitable monitoring screens include, but are not limited to, any type of computer monitor known and available in the art including desktop, laptop and handheld monitors. In order to provide for user input in real-time during the presentation while maintaining eye contact between the speaker and the audience, the monitoring screen is positioned to face the speaker such that the speaker can maintain eye contact with the audience during the presentation. In one embodiment, the monitoring screen is suitably sized for viewing by the speaker. In one embodiment, the monitoring screen is also one of the display platforms. In one embodiment, the monitoring screen is a touch sensitive screen that provides for both speaker monitoring of the presentation and speaker input. Any touch sensitive screens known and available in the art can be used as the monitoring screen.

Figure 6:
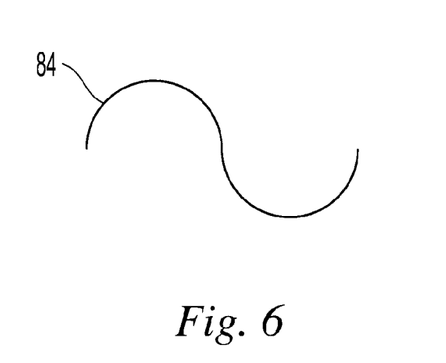
FIG. 6 is an embodiment of a corrected non-rectilinear line corresponding to the non-rectilinear line of FIG. 5.
Figure 7:
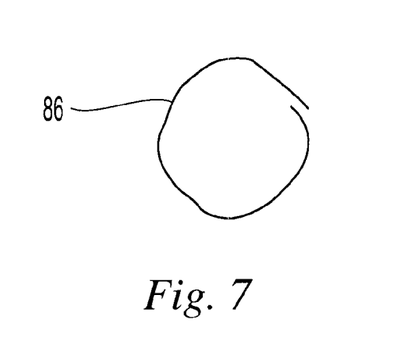
FIG. 7 is an embodiment of a perimeter of a two-dimensional space entered in accordance with the present invention.
Figure 8:
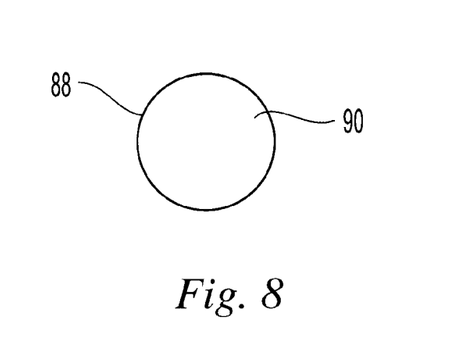
FIG. 8 is an embodiment of a corrected perimeter corresponding to the perimeter of FIG. 7.

In one embodiment, the speaker identifies at least one portion of the displayed image to be highlighted 56. Alternatively, the speaker can identify a plurality of portions of the displayed image to be highlighted. By identifying portions of the displayed image to be highlighted on the display platforms during a presentation, the speaker draws attention to specific portions of each displayed image and highlights aspects of the presentation that correlate the speaker's comments with the information and data provided on the displayed image. Suitable identified portions include, but are not limited to single points, line 80 (FIG. 4), non-rectilinear lines (FIGS. 5 and 6) and two-dimensional shapes or areas (FIGS. 7 and 8). These two dimensional shapes include geometric shapes and objects, e.g. arrows. In general, the identified portion can be viewed as a line drawn on or across the displayed image, for example a straight line, a non-rectilinear line or a line defining a perimeter of a geometric or two-dimensional shape. As used herein, non-rectilinear line includes any curved line including simple curves, compound curves and curves that form objects imbedded in text such as brackets and parentheses.

Figure 4:
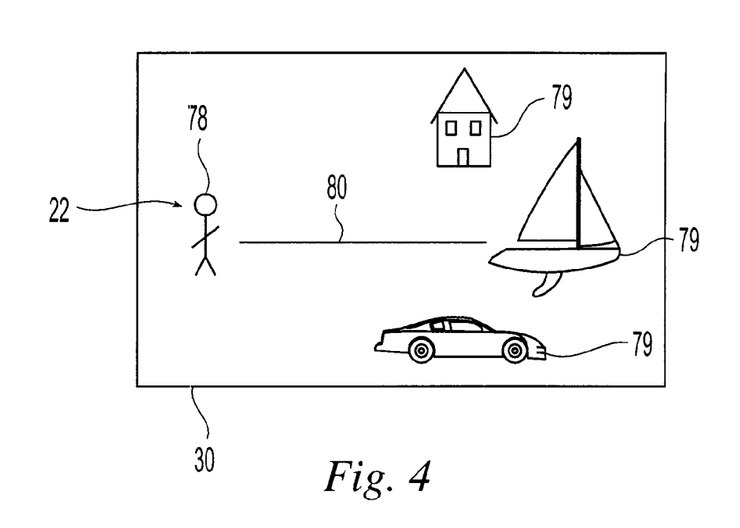
FIG. 4 is a representation of a display screen in accordance with an embodiment of the present invention.
Figure 5:
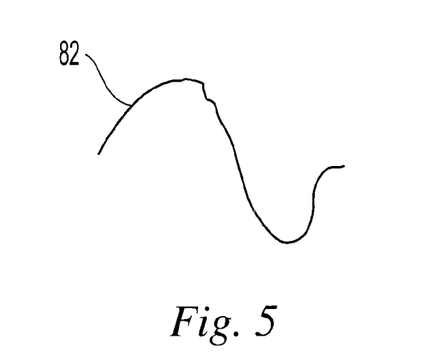
FIG. 5 is an embodiment of a non-rectilinear line entered in accordance with the present invention.

In one exemplary embodiment as illustrated in FIG. 4, identifying the portion of the displayed image includes drawing a line 80, i.e. generally straight line, between a first object 78 on the displayed image 22 and one of a plurality of second objects 79. In another embodiment as illustrated in FIG. 5, identifying the portion of the displayed image includes drawing a non-rectilinear line 82 on the displayed image 22. In another embodiment as illustrated in FIG. 7, identifying the portion of the displayed image includes drawing a two-dimensional shape 86 on the displayed image 22. For example, the two-dimensional shape can be a geometric shape and the step of drawing the two-dimensional shape includes manually drawing at least a portion of the perimeter of that shape. Preferably, the perimeter is indicated substantially around the two-dimensional shape on the displayed image so that the desired two-dimensional shape is adequately indicated.

Any method for providing user-defined input into a computer-based system can be used by the speaker to identify the desired portion of the displayed image. In one embodiment, the speaker uses a pointing or input mechanism in communication with both the monitoring screen and the control system to identify the desired portion of the displayed image. Suitable pointing mechanisms include, but are not limited to, point and click mechanisms such as a computer mouse, trackball or a touchpad. These point and click devices can be wired or wireless devices. Other suitable pointing mechanisms include touch sensitive screens, wherein a touch sensitive plate is placed on a display screen such that points on the touch sensitive plate correspond to locations on the display screen and therefore to images displayed on the display screen. These points can be touched directly by using a finger or by using another device such as a stylus. The pointing mechanism allows the speaker to manually identify the desired portion of the displayed image in real-time during a presentation.

Once identified, the user-defined portion is displayed on the monitoring screen as entered by the speaker. In one embodiment, where the speaker interaction mechanism 12 includes a touch sensitive screen acting as both the monitoring screen and the pointing mechanism, the speaker touches the touch sensitive screen at one or more locations corresponding to the desired portion of the displayed image. For example, the speaker touches the touch screen at a location corresponding to a particular object within the displayed image or draws a line, non-rectilinear line, or shape on the touch screen in a location that corresponds to the desired location on the displayed image.

Since the identified portion of the displayed image is manually entered by hand or by a hand-held device, the line, curve or shape entered will often contain imperfections or variations, for example waviness in the lines. However, these variations in the initial trajectory of the identified portion are undesirable. Waviness in the entered line results in blurriness when that line is shown on one of the display platforms. In addition, undesirable variations reduce the clarity of the identified portion. Therefore, in one embodiment the identified portion is analyzed to determine if undesirable variations in that identified portion need to be corrected 58. In one embodiment, identification of whether or not undesirable variations need to be corrected is conducted by the control system. The undesirable variations can be predefined, for example by the speaker. For example, a sudden jump in the coordinates of a line that is drawn can be considered to be an undesirable variation. If undesirable variations exist in the identified portion or, alternatively, variations exist in the identified portion that exceed a predefined limit, then the variations are corrected in the identified portion 60, resulting in a modified portion. This modified portion is used to highlight the displayed image.

In one embodiment, the identified portion is a substantially straight line across the displayed image that is manually drawn by the speaker across the displayed image using the interaction mechanisms as defined herein. The undesirable variations, i.e. waviness, motion jitter and unintended curves, are corrected in the manually drawn line, creating a modified line. Referring to FIGS. 5 and 6, the identified portion is a non-rectilinear line 82, and in particular a compound curve. Correction of undesirable variations involves applying a curve smoothing algorithm to as-drawn non-rectilinear line 82 resulting in a modified non-rectilinear line 84 (FIG. 6). In another embodiment where the identified portion of the displayed image is a two-dimensional shape, the shape is entered by manually indicating at least a portion of the perimeter of a two-dimensional shape on the displayed image. Undesirable variations are corrected by correcting the perimeter around the two-dimensional shape. In one embodiment, the two-dimensional shape is a geometric shape, for example a circle, ellipse, square, rectangle or triangle. Referring to FIGS. 7 and 8, the perimeter 86 (FIG. 7) is entered manually by the speaker resulting in variations including a wavy line and an incomplete perimeter, i.e. the circle is not completely closed. These variations are removed from the entered perimeter to create a modified perimeter 88 (FIG. 8). As illustrated, the entered perimeter is substantially the perimeter of a regular geometric shape, e.g. a circle. In one embodiment, correction of undesirable variations in the identified portion includes selecting a geometric shape from a predetermined list of predetermined shapes that matches the shape entered by the speaker. In one embodiment, this is performed by using template matching methods, which return the closest match to the drawn object.

A suitable appropriate curve smoothing algorithm employs piecewise parametric cubics and is described in M. Plass and M. Stone, "Curve-Fitting with Piecewise Parametric Cubics", SIGGRAPH 1983: Proceedings of the 10th annual conference on Computer graphics and interactive techniques, pages 229-239, ACM Press. The curve-fitting or curve-smoothing algorithm can be applied after the presenter specifies a trajectory on the touch screen, and uses all the points that recorded the presenter's touch. Alternately, the curve-fitting algorithm is applied at fixed time intervals, e.g. every second, to the points that record the presenter's touch during this interval.

Returning to FIG. 2, after any undesirable variations are corrected, or alternatively if the system and method do not check for or correct undesirable variations, at least one color in the identified portion of the displayed image is determined 62. In one embodiment, the determined color is the color of the displayed image in an area covered or occupied by the identified portion. When the identified portion is a line, the determined color is any color of the displayed image in the region or portion covered by that line. In another embodiment, the determined color is the color of the displayed image in an region immediately adjacent to the identified portion, e.g. on either side of the line. This determination of a color in the displayed image can be used for any type of identified portion including lines, non-rectilinear lines and the perimeters of two-dimensional shapes. When the identified portion is a two-dimensional shape, the determined color is selected from any color of the displayed image located within the area of the two-dimensional shape, within the portion or region of the displayed image located under the perimeter, within a portion or region of the displayed image adjacent to the perimeter and combinations thereof.

In one embodiment, two or more colors are identified in the relevant portions of the displayed image. Preferably, the average color of the displayed image in portions that are covered by or adjacent to the identified portions is identified. Suitable methods for identifying the average color of the displayed image are known and available in the literature and are made, for example, on a pixel-by-pixel basis. In one embodiment, the hue saturation value (HSV) is determined for the displayed image in the relevant portions or regions of the displayed image, yielding an average HSV or a predominant HSV in the desired regions of the displayed image indicated by the identified portion. This determination of color is made in real-time and is based on the image currently displayed at the time that the identified portion is selected by the speaker.

Having identified and determined a color in the relevant area of the displayed image covered by the identified portion, a contrasting color to the determined color is identified 64. The Commission Internationale De L'Eclairage (CIE) Delta E metric can be used to define the concept of contrasting colors. A definition of the CIE Delta E metric can be found in *Color Science*, by G. Wyszecki and W. Stiles, pg. 165, John Wiley $2^{nd}$ Edition. The CIE Delta E metric defines differences between two colors. If the CIE Delta E metric between two colors is sufficiently large, those two colors are considered to be contrasting. For example, if the CIE Delta E metric is greater than about 15, the colors are considered to contrasting, while the CIE Delta E metric is about 1 for two colors that are just noticeably different. In one embodiment for selecting a contrasting color, a color that yields a large CIR Delta E with respect to the original color is chosen, for example randomly.

Having identified the contrasting color, whether the contrasting color of a single color or the contrasting average color of the identified average color, the identified portion is highlighted in the displayed image on the display platforms by drawing or displaying the identified portion on the display platforms using the contrasting color 66. The identified portion can also be displayed on the monitoring screen using the contrasting color. By displaying the identified portion in that contrasting color, the appearance of the highlighted identified portion against the displayed image is optimized, making it easier for the audience to follow the presentation and to see the highlight. In areas of the displayed image where the colors vary significantly, the contrasting color can be varied throughout the identified portion to maintain an optimum appearance. Highlighting the identified portion using the contrasting color can be undertaken on a single display platform or on a plurality of display platforms. In one embodiment where the selected portion of the identified portion is a line or non-rectilinear line, the entire line or non-rectilinear line is displayed in the contrasting color. In an embodiment where the identified portion is a perimeter of a two-dimensional space, the perimeter, the entire two-dimensional area or both the perimeter and the entire two-dimensional area are displayed using the contrasting color. Thus, the color of the identified portion that is rendered on the displayed image will be distinct from its background, effectively improving its visibility and avoiding the problem that a fixed cursor color suffers from, i.e. if the background color is close to the cursor color, the cursor becomes difficult to see.

In one embodiment, where the display image color is not constant in the identified portion, the average color in this identified portion is determined. In one embodiment, a square area, for example of a size of about 96×96 pixels is used to calculate the average color. The nominal display size in one embodiment is about 800×600 pixels. Other square areas can be used, for example about 32×32 pixels.

In one embodiment, the identified portion of the displayed image is a two-dimensional space or area, and the area is defined as the interior of the perimeter of the two-dimensional shape drawn by the user. The perimeter drawn by the system on the displayed image is a smooth curve that is fitted to the points indicated by the user on the presentation monitor using the pointing mechanism. The area within the perimeter is filled with the contrasting average color of the initial pixels contained within the smooth two-dimensional curve perimeter. Alternatively, the pixels within the perimeter used to calculate an average color are augmented by selecting additional pixels that fall within a predetermined distance outside the perimeter. In one embodiment, display of the contrasting color is achieved through a linear combination of the selected contrasting color with the pre-existing pixel color at a given location. For example, for a given selected contrasting color, C, and an original pixel color, P, the new color is fC+(1−f)P. In one embodiment, f is a number between about 0 and about 1. Preferably, the value of f is less than about 0.5 so that the original pixel value is visible. In other words, the new color that is rendered and displayed is a weighted average of the original color and the contrasting color of the original pixel color.

In another embodiment, the complementary color of a given color is used to enhance the visibility of a highlight. As used herein, a complementary color is a color that is the most opposite, i.e. 180 degrees opposite, of a given color. For a given color, there is only one complementary color, as there is only one point that is 180 degrees opposite the given color. However, there are many contrasting colors for a given color. An algorithm to calculate a complementary color is described in "Computer Graphics, Principles and Practice", by J. D. Foley, A. Van Dam, S. K. Feiner and J. F. Hughes, Second Edition, 1997, pg. 590, Addison Wesley Publishing Company. As described, the identified color within the displayed image is represented in an HSV color space, and a complementary color is identified that is 180 degrees opposite the given color in the HSV hexcone.

In one embodiment, the visibility of the selected area and the contents of that area are enhanced by toggling the colors of the pixels within the area in a cyclical manner. For a given contrasting color, C, the complement of that contrasting color is identified, C'. For a given original color, P, of a pixel at a specified location, L, the complement of that original pixel color is identified, P'. During the first half of each color cycle, the pixel at the specified location, L, is rendered with a color that is a linear combination of the contrasting color, C, and the given original pixel color, P, and is computed by the equation given above, i.e. fC+(1−f)P. During the second half of each cycle, the pixel at the specified location, L, is rendered by the complement to the contrasting color, C', and the complement to the original pixel color, P', and is given by the equation fC'+(1−f)P'. This toggling of colors makes the contents of the selected area more visible. In one embodiment, the period of the cycle is about 2 seconds. In another embodiment, the constant f is not a set value but is represented by a quantity that changes or decays over time, causing the color modifications and toggling effect to disappear over time.

Figure 3:
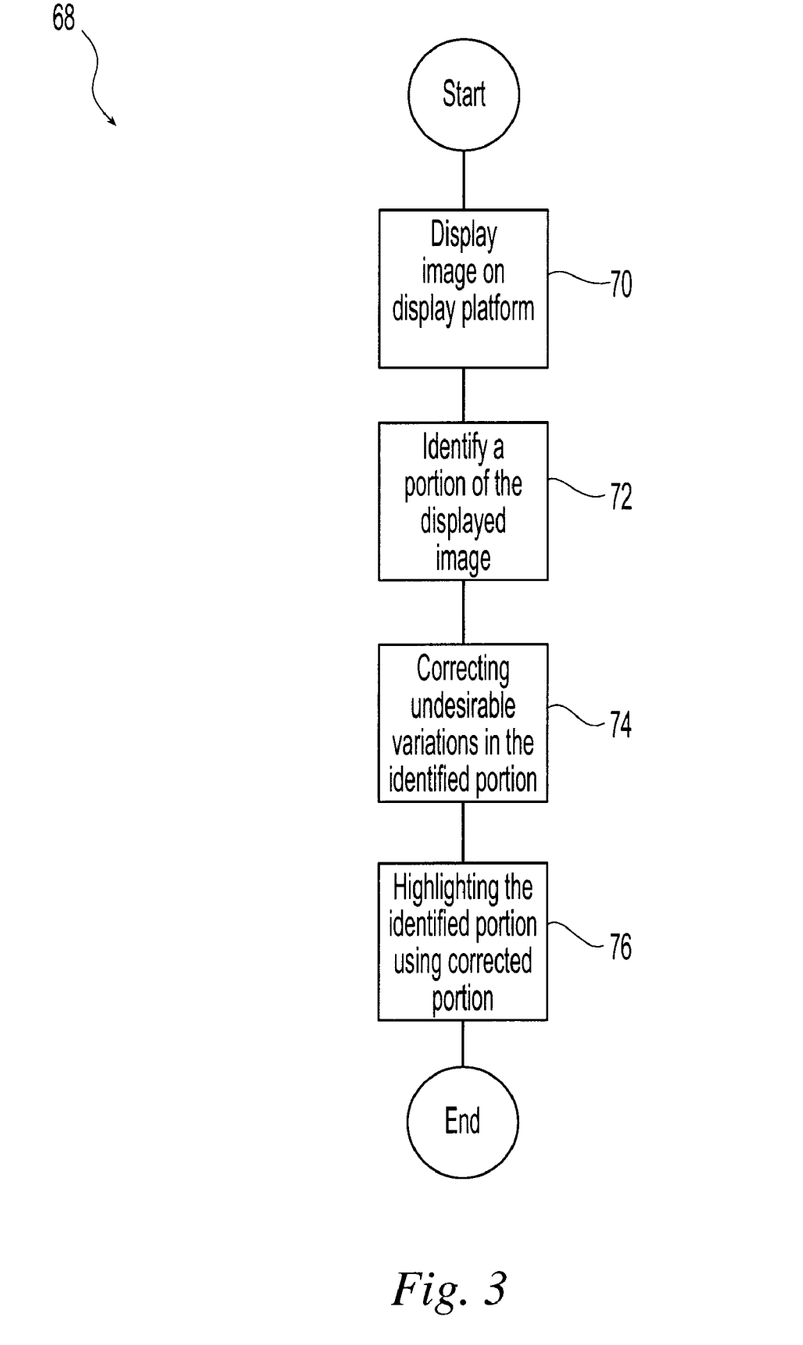
FIG. 3 is a schematic representation of another embodiment of a method for smooth pointing of objects during a presentation in accordance with the present invention.

In one embodiment as illustrated in FIG. 3, an alternative exemplary embodiment of a method for correcting the undesirable variations in the manually indicated highlight portion of the displayed image 68 in accordance with the present invention is illustrated. Initially, an image is displayed on a least one and possibly a plurality of display platforms 70. A portion of the displayed image is identified 72, for example by manually drawing a line across the displayed image. Suitable systems and methods for identifying the desired portion of the displayed image are as defined above. The identified portion includes straight lines, non-rectilinear or curved lines and perimeters of two-dimensional areas or objects on the displayed image. Undesirable variations or imperfections in the identified area are corrected 74, yielding a corrected identified portion. The corrected identified portion is drawn on 76.

Figure 9:
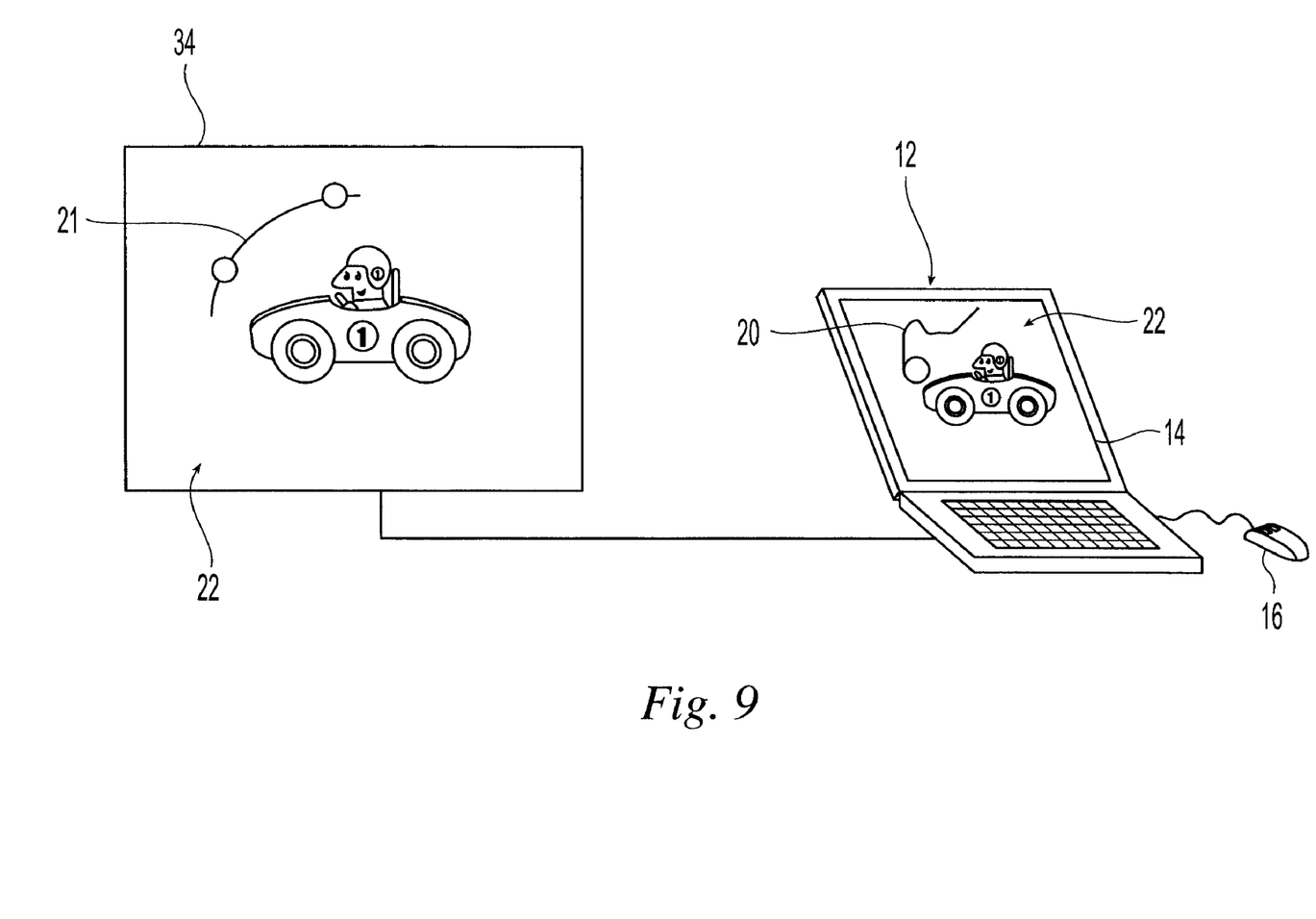
FIG. 9 is an example of one embodiment of the method in accordance with the present invention.

A first example of an exemplary embodiment of a method for highlighting a visual presentation in real time in accordance with the present invention is illustrated in FIG. 9. A presentation image 22 is displayed simultaneously on a display platform 34 and a monitoring display 14. As illustrated, the monitoring display 14 is the screen of a laptop computer, which is serving as the monitoring mechanism 12. The user input device 16 is also in communication with the laptop computer and is in the form of a computer mouse. The speaker identifies a portion 20 of the displayed image using the input device and this identified portion is displayed on the monitoring screen 14 just as it is entered by the speaker including with any waviness or imperfections that result from manual entry using the imputer device. Undesirable variations are recognized and corrected to obtain a corrected identified portion 21 that is drawn over the displayed image on the display platform 34 using computer generated graphics. As illustrated, the laptop computer also serves as the control system that controls the presentation of images for the presentation and that executes methods in accordance with the present invention.

Figure 10:
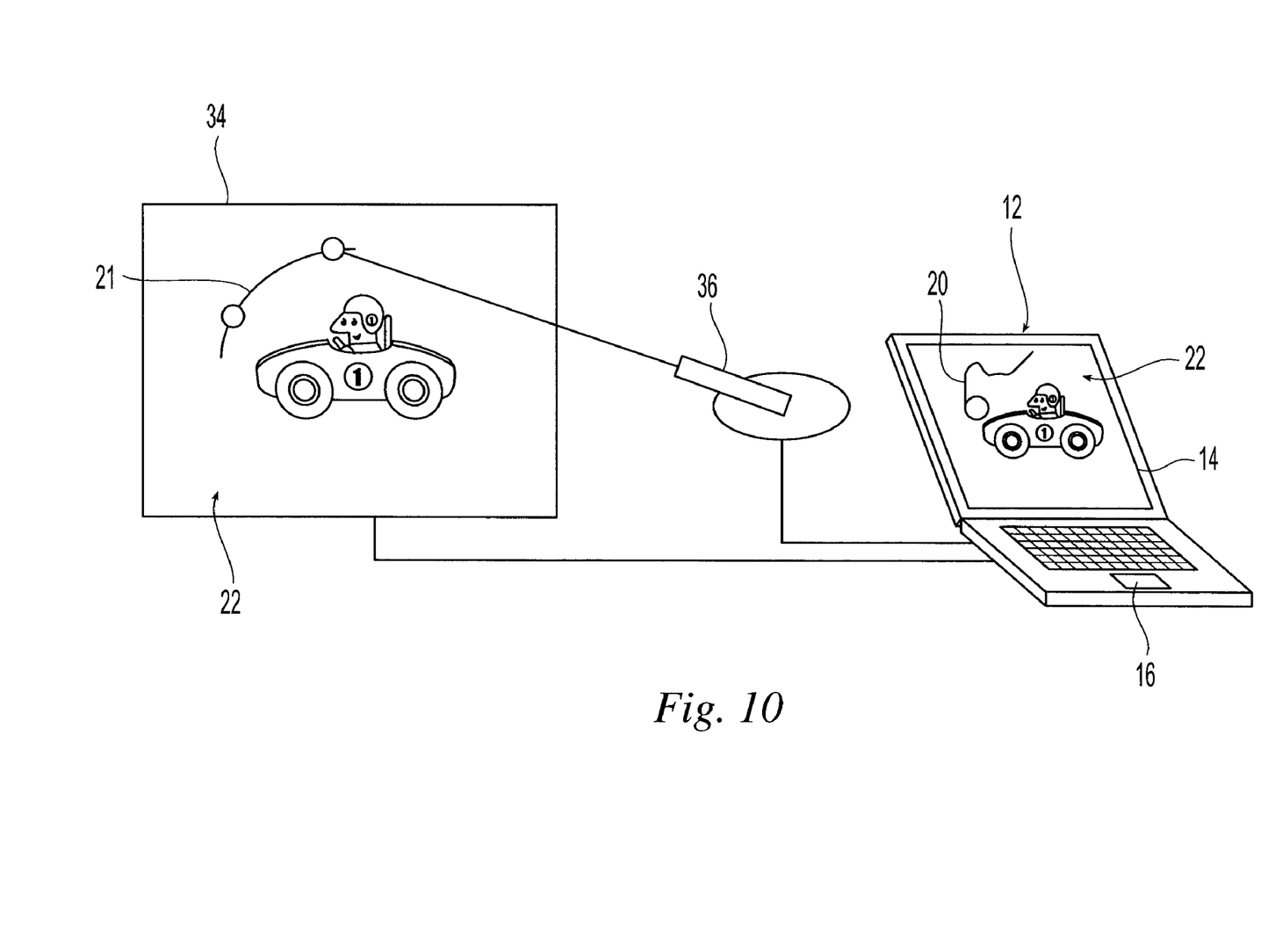
FIG. 10 is an example of another embodiment of the method in accordance with the present invention.

A second example of an exemplary embodiment of a method in accordance with the present invention is illustrated in FIG. 10. As with the first example, the monitoring mechanism 12 is a laptop computer that also serves as the control system for the presentation. The user input device 16 is a touch pad integrated into the laptop computer. The desired portion 20 of the displayed image is identified by the speaker using the touch pad and displayed on the monitoring screen 14. The identified line is corrected; however, the corrected line 21 is not drawn over the displayed image on the display platform 34 using computer-generated graphics. A motorized and controllable laser light pointer 36 in communication with the interaction mechanism is used to trace the corrected identified portion 21 across the displayed image 22.

The use of a controllable, motorized laser pointer alleviates the need for creating an adaptively varying color for the cursor. In addition, since the laser pointer is mounted on a motorized stage, the presenter does not have to face the projection screen at any time and can always face the audience directly. The motion of the motorized stage is calibrated such that the laser pointer points to the corners of the projection screen whenever the corners of the monitor used to preview the presentation are touched. The precise coordinates can be obtained through simple bicubic interpolation.

Methods and systems in accordance with the present invention enable the speaker giving a presentation in front of a live audience to face the audience at all times while speaking. In one embodiment, the speaker merely contacts a touch-screen monitor that previews the presentation, and this interaction is transformed into a color-adaptive highlight or cursor that is displayed on the final projection platform. In addition, the displayed highlight is suitably smoothed so that jittery hand motion is eliminated. This allows the presenter easier access to both his presentation materials and the audience, enabling him to deliver a more effective presentation.

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution. Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method for highlighting a portion of a displayed image in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A method for highlighting a portion of a displayed image, the method comprising:

displaying an image on at least one display platform;
identifying a portion of the displayed image to be highlighted;
determining at least one color in the identified portion of the displayed image;
identifying a contrasting color to the determined color of the identified portion such that a CIE Delta E metric between the contrasting color and the determined color comprises a predetermined size;
identifying a complementary color to the determined color of the identified portion that is 180 degrees opposite the determined color on the hue saturation value hexcone;
identifying a complementary color to the contrasting color of the determined color that is 180 degrees opposite the contrasting color on the hue saturation value hexcone; and
highlighting the identified portion of the displayed image on the display screen using a linear combination of the contrasting color and the determined color and a separate linear combination of the complementary color to the contrasting color and the complementary color to the determined color.

2. The method of claim 1, wherein the step of highlighting the identified portion further comprises toggling the identified portion between the linear combination of the contrasting color and the determined color and the linear combination of the complementary color to the contrasting color and the complementary color to the determined color.

3. The method of claim 2, wherein the step of toggling the identified portion further comprises modifying both the linear combination of the contrasting color and the determined color and the linear combination of the complementary color to the contrasting color and the complementary color to the determined color over a time period to cause color modifications and visual effects of the toggling in the identified portion to disappear over the time period.

4. The method of claim 1, further comprising displaying the image on a monitoring screen separate from the display platform, wherein the step of identifying a portion of the displayed image to be highlighted comprises using a pointing mechanism in communication with the monitoring screen to identify the portion of the displayed image.

5. The method of claim 4, wherein the monitoring screen comprises a touch sensitive screen and the step of using the pointing mechanism to identify the portion of the displayed image further comprises contacting the touch screen at one or more locations corresponding to the identified portion of the displayed image.

6. The method of claim 1, wherein:
the identified portion of the displayed image comprises a line;
the step of identifying the portion of the displayed image to be highlighted comprises:
manually drawing the line across the displayed image; and
correcting undesirable variations in the manually drawn line to create a modified line; and
the step of highlighting the identified portion further comprises displaying the modified line on the displayed image using the contrasting color.

7. The method of claim 6, wherein the line comprises a non-rectilinear line and the step of correcting undesirable variations comprises applying a curve smoothing algorithm to the non-rectilinear line.

8. The method of claim 1, wherein:
the identified portion of the displayed image comprises a two-dimensional shape;
the step of identifying the portion of the displayed image to be highlighted comprises:
manually indicating a perimeter substantially around the two-dimensional shape on the displayed image; and
correcting undesirable variations in the manually indicated perimeter to create the two-dimensional shape; and
the step of highlighting the identified portion further comprises displaying the contrasting color on the displayed image to fill an area covered by the two-dimensional shape.

9. The method of claim 8, wherein the step of correcting undesirable variations further comprises selecting a matching geometric shape from a pre-determined list of geometric shapes as the two-dimensional shape based on the manually indicated perimeter of the two-dimensional shape.

10. The method of claim 1, wherein the identified portion of the displayed image comprises a line and the step of identifying a contrasting color to the color of the identified portion comprises identifying at least one color of the displayed image along the line, in an area of the displayed image adjacent to the line or combinations thereof.

11. The method of claim 1, wherein the identified portion of the displayed image comprises a two-dimensional shape and the step of determining at least one color comprises identifying at least one color in an area of the displayed image covered by the two-dimensional shape.

12. The method of claim 1, wherein:
the step of determining at least one color in the identified portion of the displayed image further comprises identifying an average color of the displayed image in an area covered by the identified portion;
the step of identifying a contrasting color comprises identifying a contrasting average color to the average color of the identified portion; and
the step of highlighting the identified portion of the image comprises highlighting the identified portion of the image on the display screen using the contrasting average color.

13. The method of claim 1, wherein the step of determining at least one color further comprises determining a color for each pixel within the identified portion of the displayed image; and
the step of highlighting the identified portion further comprises highlighting each pixel within the identified portion using the linear combination of the contrasting color and the determined color for that pixel and the separate linear combination of the complementary color to the contrasting color and the complementary color to the determined color for that pixel.

14. A method for highlighting selected portions of a displayed image, the method comprising:
displaying an image on at least one display platform;
identifying a portion of the displayed image by manually drawing the line across the displayed image;
determining an average color in the displayed image in at least one of the area of the line or an adjacent area to the line;
identifying a contrasting color to the average color such that a CIE Delta E metric between the contrasting color and the average color comprises a predetermined size;
identifying a complementary color to the average color of the identified portion that is 180 degrees opposite the average color on the hue saturation value hexcone;
identifying a complementary color to the contrasting color of the average color that is 180 degrees opposite the contrasting color on the hue saturation value hexcone;

correcting undesirable variations in the manually drawn line using a curve smoothing algorithm to create a modified line; and highlighting the identified portion on the display platform by displaying the modified line on the displayed image using a linear combination of the contrasting color and the average color and a separate linear combination of the complementary color to the contrasting color and the complementary color to the average color.

15. The method of claim 14, wherein:

the step of identifying the line further comprises manually indicating a perimeter substantially around a two-dimensional shape on the displayed image;

the step of correcting undesirable variations comprises correcting undesirable variations in the manually indicated perimeter to create a modified perimeter defining the two-dimensional shape; and the step of highlighting the line further comprises indicating the two-dimensional image on the displayed image.

16. The method of claim 15, wherein the step of indicating the two-dimensional image on the displayed image further comprises tracing the modified perimeter using a mechanically controlled laser pointer to trace the modified line across the displayed image on the display platform.

17. A non-transitory computer-readable medium containing a computer-readable code that when read by a computer causes the computer to perform a method for highlighting a portion of a displayed image, the method comprising:

displaying an image on at least one display platform;

identifying a portion of the displayed image to be highlighted;

determining at least one color in the identified portion of the displayed image;

identifying a contrasting color to the determined color of the identified portion such that a CIE Delta E metric between the contrasting color and the determined color comprises a predetermined size;

identifying a complementary color to the determined color of the identified portion that is 180 degrees opposite the determined color on the hue saturation value hexcone;

identifying a complementary color to the contrasting color of the determined color that is 180 degrees opposite the contrasting color on the hue saturation value hexcone; and highlighting the identified portion of the displayed image on the display screen using a linear combination of the contrasting color and the determined color and a separate linear combination of the complementary color to the contrasting color and the complementary color to the determined color.

18. The non-transitory computer readable medium of claim 17, wherein:

the method further comprises displaying the image on a touch sensitive monitoring screen separate from the display platform; and the step of identifying a portion of the displayed image to be highlighted comprises contacting the touch screen at one or more locations corresponding to the identified portion of the displayed image.

19. The non-transitory computer readable medium of claim 17, wherein:

the identified portion of the displayed image comprises a non-rectilinear line;

the step of identifying the portion of the displayed image to be highlighted comprises:

manually drawing the non-rectilinear line in the displayed image; and applying a curve smoothing algorithm to the non-rectilinear line to create a modified non-rectilinear line; and the step of highlighting the identified portion further comprises displaying the modified non-rectilinear line on the displayed image using the contrasting color.

20. The non-transitory computer readable medium of claim 17, wherein:

the identified portion of the displayed image comprises a two-dimensional shape;

the step of identifying the portion of the displayed image to be highlighted comprises:

manually indicating a perimeter substantially around the two-dimensional shape on the displayed image; and correcting undesirable variations in the manually indicated perimeter to create the two-dimensional shape; and the step of highlighting the identified portion further comprises displaying the contrasting color on the displayed image to fill an area covered by the two-dimensional shape.

* * * * *